(12) United States Patent
Amit et al.

(10) Patent No.: US 9,229,941 B2
(45) Date of Patent: *Jan. 5, 2016

(54) METHOD AND SYSTEM FOR TRANSFORMATION OF LOGICAL DATA OBJECTS FOR STORAGE

(75) Inventors: Jonathan Amit, Omer (IL); Chaim Koifman, Rishon Lezion (IL); Sergey Marenkov, Yehud (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 508 days.

This patent is subject to a terminal disclaimer.

(21) Appl. No.: 13/355,138

(22) Filed: Jan. 20, 2012

(65) Prior Publication Data
US 2012/0124303 A1     May 17, 2012

Related U.S. Application Data

(63) Continuation of application No. 13/383,157, filed as application No. PCT/IL2010/000602 on Jul. 27, 2010.

(60) Provisional application No. 61/228,686, filed on Jul. 27, 2009.

(51) Int. Cl.
*G06F 12/00*     (2006.01)
*G06F 13/00*     (2006.01)
(Continued)

(52) U.S. Cl.
CPC ........ *G06F 17/30076* (2013.01); *G06F 3/0661* (2013.01); *G06F 9/30025* (2013.01)

(58) Field of Classification Search
CPC ................................................. G06F 17/30076
See application file for complete search history.

(56) References Cited

U.S. PATENT DOCUMENTS 5,321,750 A * 6/1994 Nadan .................. H04N 7/1675
                                               348/476
5,596,369 A     1/1997 Chau
(Continued)

FOREIGN PATENT DOCUMENTS

CN           1845099 A    10/2006
WO     2006023334 A2    3/2006
(Continued)

OTHER PUBLICATIONS

On the applications of multimedia processing to communications, Cox et al, Proceedings of the IEEE, col. 86, issue 5, published May 1998, pp. 755-824 (70 pages).*

(Continued)

*Primary Examiner* — Yong Choe
*Assistant Examiner* — Daniel C Chappell
(74) *Attorney, Agent, or Firm* — Griffiths & Seaton PLLC

(57) ABSTRACT

Methods for transforming a non-transformed stored logical data object (LO) into a transformed LO are provided. One method includes: a) in response to a respective transformation request, logically dividing the non-transformed LO into a segment and one or more non-transformed subsequent segments, each segment having a predefined size; b) generating a header for the respective transformed LO; c) processing said segment; d) overwriting said segment by said generated header and said transformed segment; e) indexing said transformed segment and said one or more non-transformed subsequent segments as constituting a part of said transformed LO; f) generating at least one index section; and g) updating the indication in the header to point that the non-transformed LO has been transformed in the transformed LO including said generated header, said transformed segment, said one or more subsequent segments including data in non-transformed form and said at least one index section.

24 Claims, 7 Drawing Sheets

(51) Int. Cl.
*G06F 13/28* (2006.01)
*G06F 17/30* (2006.01)
*G06F 9/30* (2006.01)
*G06F 3/06* (2006.01)

(56) References Cited

U.S. PATENT DOCUMENTS

| | | | |
|---|---|---|---|
| 5,602,987 A * | 2/1997 | Harari | G06F 3/0601 |
| | | | 365/185.29 |
| 5,630,093 A * | 5/1997 | Holzhammer | G06F 3/0601 |
| | | | 711/115 |
| 5,701,452 A | 12/1997 | Siefert | |
| 5,721,720 A | 2/1998 | Kikuchi et al. | |
| 5,737,595 A * | 4/1998 | Cohen | G06F 17/30575 |
| 5,813,017 A * | 9/1998 | Morris | G06F 11/1451 |
| 5,867,112 A | 2/1999 | Kost | |
| 5,897,219 A | 4/1999 | Yoo et al. | |
| 5,987,214 A | 11/1999 | Iwamura | |
| 6,058,241 A | 5/2000 | Kawamura et al. | |
| 6,079,047 A | 6/2000 | Cotugno et al. | |
| 6,081,665 A * | 6/2000 | Nilsen | G06F 9/45504 |
| | | | 711/E12.011 |
| 6,094,453 A | 7/2000 | Gosselin et al. | |
| 6,108,727 A | 8/2000 | Boals et al. | |
| 6,195,664 B1 * | 2/2001 | Tolfa | G06F 17/30076 |
| | | | 370/396 |
| 6,256,348 B1 | 7/2001 | Laczko et al. | |
| 6,260,043 B1 * | 7/2001 | Puri | G06F 17/30076 |
| 6,377,952 B1 * | 4/2002 | Inohara | G06F 17/30076 |
| 6,377,958 B1 * | 4/2002 | Orcutt | G06F 17/30076 |
| | | | 707/690 |
| 6,385,706 B1 | 5/2002 | Ofek et al. | |
| 6,484,178 B1 * | 11/2002 | Bence, Jr. | G06F 17/30076 |
| 6,526,144 B2 | 2/2003 | Markandey et al. | |
| 6,862,601 B2 * | 3/2005 | Doney | G06F 17/30076 |
| 6,920,331 B1 | 7/2005 | Sim et al. | |
| 7,062,710 B2 * | 6/2006 | Gunn | G06F 17/30076 |
| | | | 707/E17.006 |
| 7,100,199 B2 | 8/2006 | Ginter et al. | |
| 7,164,802 B2 | 1/2007 | Braica | |
| 7,209,972 B1 | 4/2007 | Ignatius et al. | |
| 7,231,460 B2 | 6/2007 | Sullivan et al. | |
| 7,236,992 B2 | 6/2007 | Yano et al. | |
| 7,277,455 B2 | 10/2007 | Hsu et al. | |
| 7,523,221 B2 | 4/2009 | Hillberg et al. | |
| 7,529,905 B2 * | 5/2009 | Sinclair | G06F 12/0246 |
| | | | 711/103 |
| 7,536,418 B2 | 5/2009 | Buchsbaum et al. | |
| 7,577,807 B2 * | 8/2009 | Rowan | G06F 11/1469 |
| | | | 711/114 |
| 7,581,175 B1 | 8/2009 | Skwirblies | |
| 7,836,105 B2 | 11/2010 | Marriott et al. | |
| 7,840,750 B2 | 11/2010 | Baek et al. | |
| 7,925,683 B2 | 4/2011 | Jain et al. | |
| 7,934,055 B2 * | 4/2011 | Flynn | G06F 1/183 |
| | | | 711/114 |
| 8,015,440 B2 * | 9/2011 | Flynn | G06F 1/183 |
| | | | 711/114 |
| 8,019,938 B2 * | 9/2011 | Flynn | G06F 1/183 |
| | | | 711/113 |
| 8,019,940 B2 * | 9/2011 | Flynn | G06F 1/183 |
| | | | 710/22 |
| 8,046,500 B2 * | 10/2011 | Flynn | G06F 3/061 |
| | | | 710/36 |
| 8,086,650 B1 | 12/2011 | Milford | |
| 8,089,948 B2 | 1/2012 | Garudadri et al. | |
| 8,151,082 B2 * | 4/2012 | Flynn | G06F 3/0613 |
| | | | 711/202 |
| 8,171,165 B2 | 5/2012 | Peng et al. | |
| 8,190,655 B2 * | 5/2012 | LaBerge | G06F 17/30076 |
| | | | 707/809 |
| 8,239,639 B2 | 8/2012 | Sinclair | |
| 8,321,041 B2 | 11/2012 | Jellison, Jr. et al. | |
| 8,451,940 B2 | 5/2013 | Yang et al. | |
| 8,468,172 B2 | 6/2013 | Block et al. | |
| 8,482,993 B2 * | 7/2013 | Strasser | G06F 1/183 |
| | | | 365/189.09 |
| 8,554,738 B2 * | 10/2013 | Marshall | G06Q 10/10 |
| | | | 707/661 |
| 8,620,970 B2 * | 12/2013 | English | G06F 17/30076 |
| | | | 707/803 |
| 8,626,726 B2 * | 1/2014 | Koifman | G06F 3/0623 |
| | | | 707/687 |
| 8,667,035 B2 | 3/2014 | DeLorme et al. | |
| 8,732,178 B2 | 5/2014 | Holmes et al. | |
| 8,832,308 B2 * | 9/2014 | Tsutsui | G06F 17/30017 |
| | | | 709/231 |
| 8,836,548 B1 | 9/2014 | Chandra | |
| 8,850,514 B2 | 9/2014 | McGrath et al. | |
| 8,903,874 B2 | 12/2014 | Mason et al. | |
| 8,909,675 B2 | 12/2014 | Kamath et al. | |
| 9,047,293 B2 | 6/2015 | Grafi et al. | |
| 9,063,912 B2 * | 6/2015 | Seibert, Jr. | G06F 17/212 |
| 2001/0025360 A1 * | 9/2001 | Kakuta | G06F 11/1076 |
| | | | 714/769 |
| 2002/0143794 A1 * | 10/2002 | Helt | G06F 17/30076 |
| 2003/0037302 A1 * | 2/2003 | Dzienis | G06F 17/30076 |
| | | | 715/249 |
| 2003/0065805 A1 * | 4/2003 | Barnes, Jr. | G06Q 10/02 |
| | | | 709/231 |
| 2003/0088783 A1 * | 5/2003 | DiPierro | G06F 21/6245 |
| | | | 713/189 |
| 2003/0140055 A1 | 7/2003 | Doney et al. | |
| 2003/0149683 A1 | 8/2003 | Lee et al. | |
| 2003/0191938 A1 | 10/2003 | Woods et al. | |
| 2004/0015890 A1 | 1/2004 | Wong et al. | |
| 2004/0030995 A1 * | 2/2004 | Bhogal | G06F 17/30076 |
| | | | 715/249 |
| 2004/0044660 A1 | 3/2004 | Pyun | |
| 2004/0049738 A1 | 3/2004 | Thompson et al. | |
| 2004/0153642 A1 * | 8/2004 | Plotkin | G06F 21/85 |
| | | | 713/150 |
| 2004/0218760 A1 * | 11/2004 | Chaudhuri | H04N 7/161 |
| | | | 380/217 |
| 2005/0204154 A1 * | 9/2005 | Osaki | H04L 9/088 |
| | | | 713/193 |
| 2005/0257062 A1 * | 11/2005 | Ignatius | G06F 21/6209 |
| | | | 713/176 |
| 2006/0015535 A1 | 1/2006 | Buchsbaum et al. | |
| 2006/0034455 A1 * | 2/2006 | Damgaard | H04L 9/0861 |
| | | | 380/28 |
| 2006/0136365 A1 | 6/2006 | Kedem et al. | |
| 2006/0184722 A1 * | 8/2006 | Sinclair | G06F 3/0607 |
| | | | 711/103 |
| 2006/0184723 A1 * | 8/2006 | Sinclair | G06F 3/0608 |
| | | | 711/103 |
| 2006/0190643 A1 * | 8/2006 | Kedem | G06F 3/0608 |
| | | | 710/68 |
| 2006/0212554 A1 * | 9/2006 | Shouno | H04L 29/12528 |
| | | | 709/221 |
| 2006/0230014 A1 * | 10/2006 | Kedem | G06F 3/0605 |
| 2006/0273933 A1 * | 12/2006 | Kerber | H03M 7/3084 |
| | | | 341/50 |
| 2006/0277225 A1 * | 12/2006 | Mark | G06F 17/30076 |
| 2007/0033326 A1 | 2/2007 | Sinclair | |
| 2007/0033375 A1 * | 2/2007 | Sinclair | G06F 12/0246 |
| | | | 711/203 |
| 2007/0086260 A1 * | 4/2007 | Sinclair | G06F 12/0246 |
| | | | 365/230.03 |
| 2007/0088904 A1 * | 4/2007 | Sinclair | G06F 12/0246 |
| | | | 711/103 |
| 2008/0010324 A1 | 1/2008 | Stebner et al. | |
| 2008/0082589 A1 | 4/2008 | English et al. | |
| 2008/0140724 A1 | 6/2008 | Flynn et al. | |
| 2008/0298458 A1 | 12/2008 | Yang et al. | |
| 2008/0307158 A1 * | 12/2008 | Sinclair | G06F 12/0246 |
| | | | 711/103 |
| 2008/0313371 A1 | 12/2008 | Kedem et al. | |
| 2009/0049459 A1 * | 2/2009 | Battepati | G06F 17/30179 |
| | | | 719/331 |
| 2009/0172014 A1 | 7/2009 | Huetter et al. | |
| 2009/0307249 A1 | 12/2009 | Koifman et al. | |
| 2009/0307250 A1 | 12/2009 | Koifman et al. | |
| 2009/0316774 A1 | 12/2009 | Yang et al. | |

(56) References Cited

U.S. PATENT DOCUMENTS

| | | |
|---|---|---|
| 2009/0327751 A1 | 12/2009 | Koifman et al. |
| 2010/0036863 A1 | 2/2010 | Koifman et al. |
| 2010/0223423 A1* | 9/2010 | Sinclair ................. G06F 3/0608 711/103 |
| 2010/0250891 A1* | 9/2010 | Shalev ................... G06F 3/061 711/171 |
| 2011/0107046 A1 | 5/2011 | Chen et al. |
| 2011/0258512 A1 | 10/2011 | Flynn et al. |
| 2011/0264632 A1 | 10/2011 | Koifman et al. |
| 2011/0264633 A1 | 10/2011 | Koifman et al. |
| 2011/0264634 A1 | 10/2011 | Koifman et al. |
| 2011/0264871 A1 | 10/2011 | Koifman et al. |
| 2011/0264872 A1 | 10/2011 | Koifman et al. |
| 2011/0264924 A1 | 10/2011 | Koifman et al. |
| 2011/0276545 A1 | 11/2011 | Koifman et al. |
| 2011/0276546 A1 | 11/2011 | Koifman et al. |
| 2011/0276547 A1 | 11/2011 | Koifman et al. |
| 2011/0276548 A1 | 11/2011 | Koifman et al. |
| 2011/0282914 A1 | 11/2011 | Block et al. |
| 2011/0283021 A1 | 11/2011 | Koifman et al. |
| 2012/0117341 A1 | 5/2012 | Amit et al. |
| 2012/0144207 A1 | 6/2012 | Koifman et al. |
| 2012/0151221 A1 | 6/2012 | Koifman et al. |
| 2013/0268561 A1* | 10/2013 | Christie ............ G06F 17/30587 707/777 |
| 2014/0019472 A1 | 1/2014 | Franke et al. |
| 2014/0036317 A1 | 2/2014 | Krig et al. |
| 2014/0046952 A1 | 2/2014 | McPhail |
| 2014/0095550 A1 | 4/2014 | Rantanen et al. |
| 2014/0101181 A1 | 4/2014 | Shyryayev |
| 2014/0222718 A1 | 8/2014 | Usui |
| 2014/0250104 A1 | 9/2014 | Ghaskadvi et al. |
| 2014/0258258 A1 | 9/2014 | Tecu |
| 2014/0280401 A1* | 9/2014 | Arai .................. G06F 17/30076 707/827 |
| 2015/0128018 A1* | 5/2015 | Hurlbut ............... G06F 17/2252 715/212 |

FOREIGN PATENT DOCUMENTS

| | | | |
|---|---|---|---|
| WO | 2007138600 A2 | 12/2007 | |
| WO | WO2007138602 A2 * | 12/2007 | ............. G06G 19/00 |
| WO | WO 2007138602 A2 * | 12/2007 | |

OTHER PUBLICATIONS

On the applications of multimedia processing to communications, Cox et al, Proceedings of the IEEE, vol. 86, issue 5, published May 1998, pp. 755-824 (70 pages).*

Image and video coding-emerging standards and beyond, Haskell et al., IEEE Transactions on Circuits and Systems for Video Technology, vol. 8, issue 7, Nov. 1998, pp. 814-837 (24 pages).*

Video fingerprinting and encryption principles for digital rights management, Kundur et al., Proceedings of the IEEE, vol. 92, issue 6, published Jun. 2004, pp. 918-932 (15 pages).*

E.G.—What Does e.g. Mean?, N.S. Gill, retrieved from http://ancienthistory.about.com/od/abbreviations/f/ievseg.htm on Jan. 8, 2014 (1 page).*

A universal algorithm for sequential data compression, Ziv et al., IEEE Transactions on Information Theory, vol. 23, iss. 3, May 1977, pp. 337-343 (7 pages).

Definition of encryption, Webopedia, retrieved from http://www.webopedia.com/TERM/encryption.html on Jul. 2, 2014 (1 page).

* cited by examiner

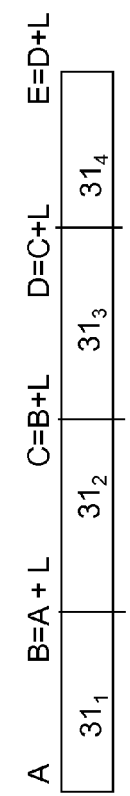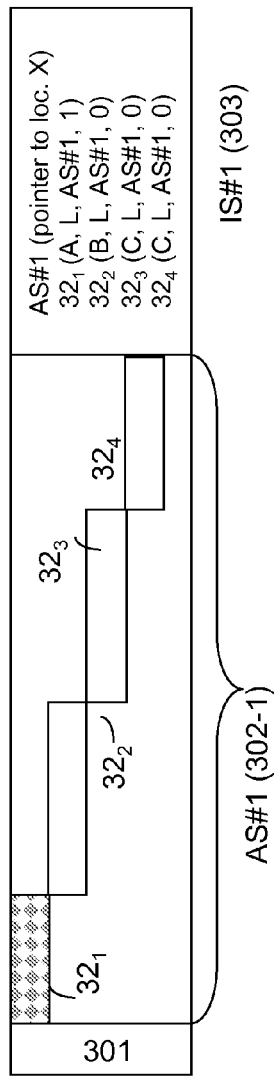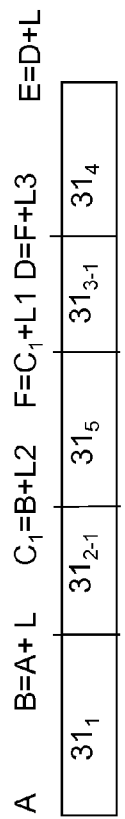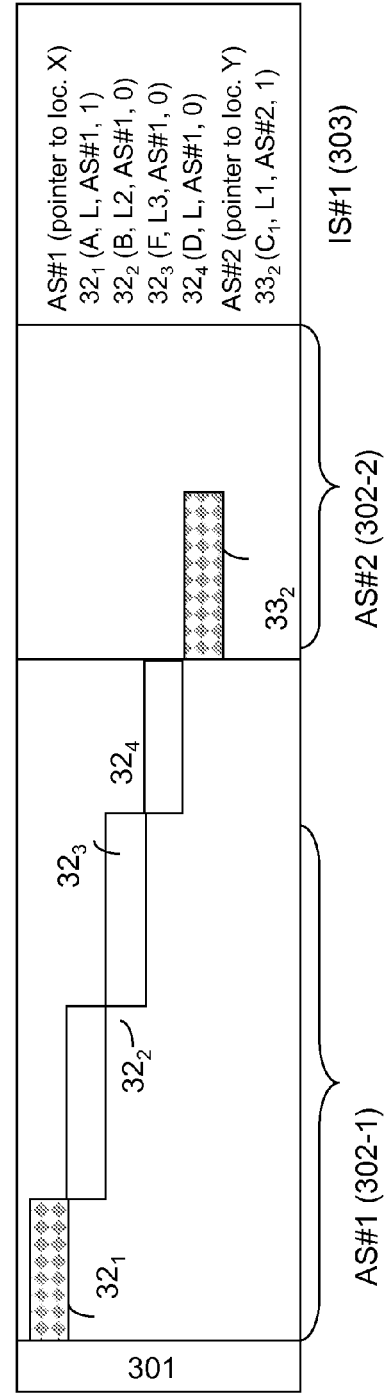
Figure 4a
Figure 4b

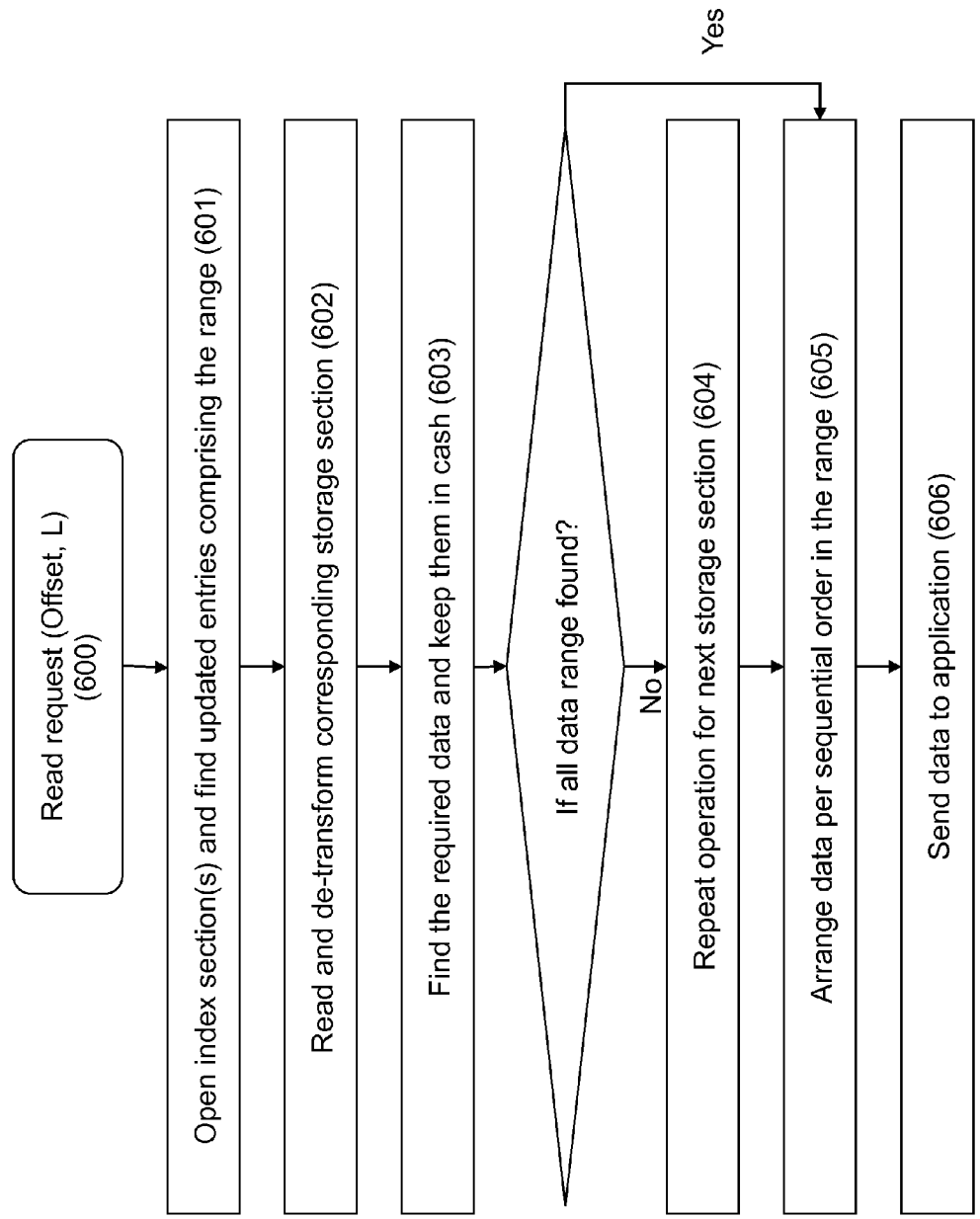

METHOD AND SYSTEM FOR TRANSFORMATION OF LOGICAL DATA OBJECTS FOR STORAGE

CROSS-REFERENCES TO RELATED APPLICATIONS

This application is a continuation of U.S. patent application Ser. No. 13/383,157, filed on Jan. 9, 2012, which claims priority to International Application No. PCT/IL10/00602, filed on Jul. 27, 2010, which relates to and claims priority from U.S. Provisional Patent Application No. 61/228,686 filed on Jul. 27, 2009, each of which is incorporated herein by reference in their entirety.

FIELD OF THE INVENTION

This invention relates to computing systems, and, in particular, to methods and systems capable of transforming logical data objects stored in computing systems and networks thereof.

BACKGROUND OF THE INVENTION

With increasing demand for faster, more powerful and more efficient ways to store information, optimization of storage technologies is becoming a key challenge.

Logical data objects (data files, image files, data blocks, etc.) may be transformed for transmission and/or storage purposes. The transformation may comprise compression, encryption, encoding, etc. and/or combinations thereof. For example, data compression techniques are used to reduce the amount of data to be stored or transmitted in order to reduce the storage capacity and transmission time respectively. Compression may be achieved by using different compression algorithms known in the art. Data stored in plaintext is open to potential malicious use (e.g. unauthorized access, misuse, theft, etc.), and known in the art solutions for perimeter and/or access control (e.g. firewalls, Virtual Private Networks, LUN masking control and zoning in SAN storage networks, NAS security control features, etc.) still leave security vulnerabilities. Encrypting data to be stored may considerably reduce security threats; such encryption may be provided by using different algorithms known in the art.

The problems of compressing, compression with encrypting or other transforming data for storage and access to the stored transformed data have been recognized in the Prior Art and various systems have been developed to provide a solution as, for example, International Applications WO2007138600, WO2007138601 and WO2007138602 published Dec. 12, 2007 and assigned to the assignee of the present application. The entire contents of said International Applications are hereby incorporated by reference in their entirety.

SUMMARY OF THE INVENTION

Optimization of stored data may request converting the stored data from original to transformed form. Such optimization may enable, for example, reducing storage/disk space, reducing the runtime I/O demands on the storage, increasing data security, etc. A known process of straight forward converting the stored original data into transformed form requires downtime of the storage system, such downtime may be very long (e.g. required downtime for compressing data stored in a big enterprise may be months and even years). Among advantages of certain embodiments of the present invention is enabling converting original data into transformed form in a substantially seamless manner, with no need in downtime for this process.

In accordance with certain aspects of the subject matter of the present application, there is provided a method of transforming a non-transformed logical data object (LO) stored in a storage device into a transformed LO stored in the storage device, the storage device operable with at least one storage protocol. The method comprises: a) in response to a respective transformation request, logically dividing the non-transformed LO in a first segment and one or more non-transformed subsequent segments, the segments having predefined size; b) generating a header for the respective transformed LO, said header comprising an indication that the transformation process is "in progress"; c) processing said first segment thus giving rise to a transformed first segment comprising data in transformed form; d) if the total size of said generated header and said transformed first segment matches a predefined size criteria, overwriting said first segment by said generated header and said transformed first segment; e) indexing said first transformed segment and said one or more non-transformed subsequent segments as constituting a part of said transformed LO, thus giving rise to indexed segments; f) generating at least one index section comprising at least one entry holding at least information related to said indexed segments, said information comprising offset of each segment in said non-transformed LO, indication of a storage location of respective indexed segment and indication if said indexed segment comprises data in original or transformed form; and g) updating the indication in the header to point that the non-transformed LO has been transformed in the transformed LO comprising said generated header, said first transformed segment, said one or more subsequent segments comprising data in non-transformed form and said at least one index section.

The size of each non-transformed subsequent segment may be configured as equal to the maximal size of data in a single I/O operation in accordance with respective storage protocol.

The size of the first segment may be configured as equal to the sum of a predefined size of the header and the maximal size of data in a single I/O operation in accordance with respective storage protocol, or, alternatively, as equal to the maximal size of data in a single I/O operation.

The transformation request may be obtained by intercepting an access request to the non-transformed LO, and generating a request for transforming the non-transformed LO if said non-transformed LO matches predefined transformation criteria. Alternatively or additionally, the transformation request may be received from a maintenance unit capable to recognize a non-transformed LO among stored LOs and to generate a request for transforming said recognized non-transformed LO.

Optionally, the first transformed segment and one or more subsequent non-transformed segments may be indexed as data chunks sequentially stored into one or more storage blocks with a predefined size, wherein the storage sequence corresponds to the sequence of the segments in the non-transformed LO.

In accordance with further aspects, the method may further comprise: a) responsive to a request for further transformation, recognizing with a help of the index section at least one subsequent non-transformed segment comprising range with live data and matching predefined further transformation criteria; b) processing the respective range and sequentially storing the resulted data chunk with transformed data as a new log in an allocated storage block with a predefined size; and c) updating the index section in a manner facilitating one-to-one relationship between each point in the data range in the non-transformed LO and the live data to be read from the transformed LO.

The request for further transformation may be obtained by intercepting a write request to the non-transformed LO, analyzing if respective transformed LO comprises data in original form, and, if yes, generating a request for transforming data stored in said transformed LO in original form. Alternatively or additionally, the request for further transformation may be received from a maintenance unit capable to scan the transformed LOs stored at the storage device, recognize LOs comprising data in original form, and, in accordance with predefined further transformation criteria, generate requests for transforming such data.

In accordance with further aspects, the method may further comprise writing a data range to the transformed LO. The writing further comprises: a) in response to a respective write request, processing one or more sequentially obtained chunks of data corresponding to said data range, wherein at least one of the processed data chunks comprises data in transformed form resulting from said processing; b) sequentially storing the processed data chunks in an allocated storage block with a predefined size, wherein the storage is provided in accordance with the order of receiving the chunks; and c) updating the index section in a manner facilitating one-to-one relationship between the data in the range and respective data to be read from the transformed LO.

In accordance with further aspects, the method may further comprise reading a data range from a transformed LO, said reading comprises: a) in response to a respective read request, discovering all created and/or last-updated entries in the index section related to the data within the range; b) extracting the data to be read in accordance with the mapping provided by the entries as follows: i) for the data to be read stored in the first segment, de-transforming the segment and extracting the required data; ii) for the data to be read stored in one or more subsequent non-transformed segments, reading the respective segments and extracting the required data; iii) for otherwise stored data to be read, de-transforming the respective one or more storage blocks and extracting the required data; and c) arranging the extracted data in accordance with their order in the range.

Response to access request (e.g. write request, read request, etc.) may be configured as having higher priority than response to request for further transformation.

In accordance with other aspects of the subject matter of the present application, there are provided a communication device and/or storage device and/or transformation system operable in a storage network and being configured to perform the provided method.

In accordance with other aspects of the subject matter of the present application, there is provided a system capable of transforming a non-transformed stored logical data object (LO) into a transformed LO. The system comprises: a) means for logically dividing the non-transformed LO in a first segment and one or more non-transformed subsequent segments, the segments having predefined size; b) means for generating a header for the respective transformed LO, said header comprising an indication that the transformation process is "in progress"; c) means for processing said first segment thus giving rise to a transformed first segment comprising data in transformed form; d) means for enabling overwriting said first segment by said generated header and said transformed first segment if the total size of said generated header and said transformed first segment matches predefined size criteria, e) means for indexing said first transformed segment and said one or more non-transformed subsequent segments as constituting a part of said transformed LO, thus giving rise to indexed segments; f) means for generating at least one index section comprising at least one entry holding at least information related to said indexed segments, said information comprising offset of each segment in said non-transformed LO, indication of a storage location of respective indexed segment and indication if said indexed segment comprises data in original or transformed form; and g) means for updating the indication in the header to point that the non-transformed LO has been transformed in the transformed LO comprising said generated header, said first transformed segment, said one or more subsequent segments comprising data in non-transformed form and said at least one index section.

The system may further comprise means for intercepting an access request to the non-transformed LO, and generating a request for transforming the non-transformed LO if said non-transformed LO matches predefined transformation criteria.

Alternatively or additionally, the system may further comprise a maintenance unit capable to recognize a non-transformed LO among stored LOs and to generate a request for transforming said recognized non-transformed LO.

In accordance with further aspects, the system may further comprise: a) means for recognizing with a help of the index section at least one subsequent non-transformed segment comprising range with live data and matching predefined further transformation criteria; b) means for processing the respective range and sequentially storing the resulted data chunk with transformed data as a new log in an allocated storage block with a predefined size; and c) means for updating the index section in a manner facilitating one-to-one relationship between each point in the data range in the non-transformed LO and the live data to be read from the transformed LO.

In accordance with further aspects, the system may further comprise means for intercepting a write request to the non-transformed LO, analyzing if respective transformed LO comprises data in original form, and, if yes, generating a request for transforming data stored in said transformed LO in original form.

Alternatively or additionally, the system may further comprise a maintenance unit capable to scan the transformed LOs stored at the storage device, recognize LOs comprising data in original form, and, in accordance with predefined further transformation criteria, generate requests for transforming such data.

In accordance with other aspects of the subject matter of the present application, there is provided a maintenance unit configured to work in conjunction with a system capable of transforming a non-transformed stored logical data object (LO) into a transformed LO. The maintenance unit is configured to recognize a non-transformed LO among stored LOs and to generate one or more requests to the system for transforming said recognized non-transformed LO. The maintenance unit may be further configured to scan the stored transformed LOs, to recognize LOs comprising data in original form, and, in accordance with predefined further transformation criteria, to generate one or more requests to the system for transforming such data.

BRIEF DESCRIPTION OF THE DRAWINGS

In order to understand the invention and to see how it may be carried out in practice, embodiments will now be described, by way of non-limiting example only, with reference to the accompanying drawings, in which:

FIGS. 4a-c illustrate schematic diagrams of transformed logical data objects during a further transformation process and concurrent update process in accordance with certain embodiments of the present invention;

FIG. 6 illustrates a generalized flowchart of read operation on a transformed logical data object in accordance with certain embodiments of the present invention.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "generating", "activating", "reading", "writing" or the like, refer to the action and/or processes of a computer that manipulate and/or transform data into other data, said data represented as physical, such as electronic, quantities and/or said data representing the physical objects.

The term "computer" should be expansively construed to cover any kind of electronic device with data processing capabilities. The operations in accordance with the teachings herein may be performed by a computer specially constructed for the desired purposes or by a general purpose computer specially configured for the desired purpose by a computer program stored in a computer readable storage medium.

Embodiments of the present invention are not described with reference to any particular programming language. It will be appreciated that a variety of programming languages may be used to implement the teachings of the inventions as described herein.

The term "logical data object (LO)" used in this patent specification should be expansively construed to include any types and granularities of data units used in a computing system and handled as one unit (e.g. data files, archive files, image files, database files, memory data blocks, stream data blocks, predefined segments of files, etc.).

Figure 1:
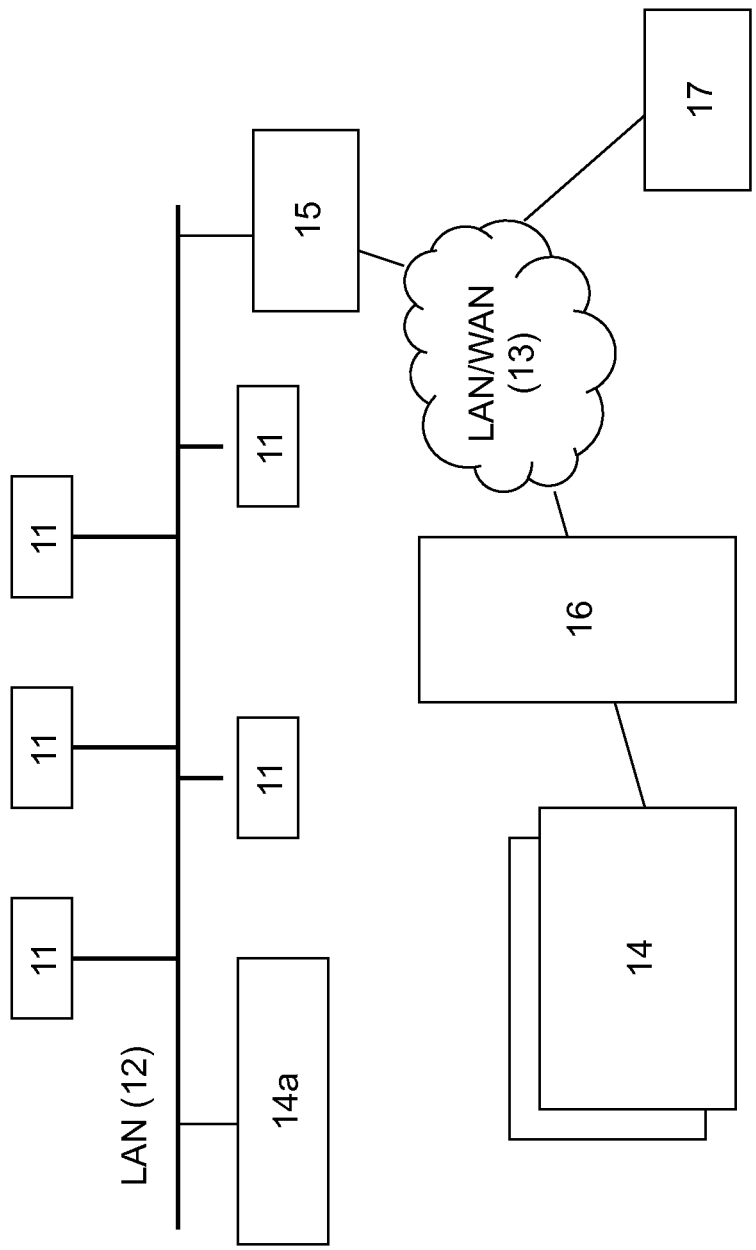
FIG. 1 illustrates a schematic block diagram of storage network architecture applicable to certain embodiments of the present invention.

Bearing this in mind, attention is drawn to FIG. 1 illustrating a schematic diagram of storage network architecture applicable to certain embodiments of the present invention. The logical data objects (LO) from clients 11 (workstations, application servers, etc.) transferred via networks 12 and/or 13 to storage device(s) 14 (e.g. specialized NAS file servers, general purpose file servers, SAN storage, stream storage device, etc.) and/or 14a. The network comprises one or more communication devices 15 (e.g. switch, router, bridge, etc.) facilitating the data transfer. The storage in the illustrated network may be wholly or partly implemented using block mode access and/or file mode access storage protocols. In file mode access the logical data objects (LOs) are constituted by files, and the network is IP network (e.g. local area network (LAN), wide area network (WAN), combination thereof, etc.). In block mode access embodiments, the logical data objects are constituted by data blocks and the network is Storage Area Network (SAN) implementing, for example, Fiber Channel or iSCSI protocols. In certain embodiments the storage device (14a) may be directly connected to the client 11, e.g. via block mode access storage protocols as SCSI, Fiber Channel, etc. Such Direct Access Storage may include, for example, the internally attached local disk drives or externally attached RAID (redundant array of independent disks) or JBOD (just a bunch of disks), etc.

Some LOs may be stored as non-transformed LOs and comprise data in original form. Alternatively or additionally, some LOs may be stored as transformed LOs and comprise data in a transformed form and/or original form. In accordance with certain embodiments of the present invention, at least part of stored non-transformed LOs may be converted in the transformed LOs. The transformation or part thereof may be provided, by way of non-limiting example, by a transformation system 16 operatively coupled to the clients and the storage device(s). Typically the secure keys used for encryption (if required) are held separately from the device providing encryption and/or storage, for example, they may be held at a key holding platform 17 operatively coupled with the transformation system 16. Likewise, coding tables and similar external data involved in the transformation process may be held separate from the processing and/or storage devices.

The term "non-transformed logical data object" used in this patent specification should be expansively construed to include any logical object before transformation provided in accordance with teachings of the present application. Non-transformed logical object comprises therein data in a form that is original with regard to further provided transformation. Those versed in the art will readily appreciate that the original form of data may represent raw data and/or may result from a previous processing. By way of non-limiting example, the non-transformed LO may comprise raw data (original form) while the transformed LO may comprise compressed and/or encrypted raw data (transformed form). By way of another non-limiting example, the non-transformed LO may comprise compressed data (original form) or converted data (original form), while the transformed LO may comprise encrypted compressed data (transformed form), encrypted encoded data (transformed form), compressed encoded data (transformed form), etc.

The transformation system 16 is configured to intercept LO call operations (LO access-related requests) as well as some control transactions (e.g. set end of LO) and to act as a proxy on certain transactions (e.g. keeping the throughput on most control transactions and proxy on data transactions and certain control transactions). The transformation system is capable of deriving and processing data corresponding to the intercepted LO access-related request, facilitating communication with and/or within the file system for storing the processed data at the storage medium as at least one transformed LO and/or facilitating de-transformation of at least part of the processed data corresponding to the intercepted LO request. During "write" operations on the LO to be processed for storage, the transformation system 16 receives from the clients 11 through the network 13 data corresponding to said LOs, transforms the data and facilitates writing at the storage device 14. A "read" operation proceeds in the reverse direction; the required LOs are retrieved by the transformation system, de-transformed (partly or entirely, in accordance with required data range) and sent to the appropriate client. When appropriate, the transformation system is configured to communicate with the external platform (e.g. keys holding platform 17) to obtain external data involved in the transformation process (e.g. secure keys and/or secure values or other metadata thereof involved in the transformation).

Note that the invention is not bound by the specific architecture described with reference to FIG. 1. Those versed in the art will readily appreciate that the invention is, likewise, applicable to any computing system and any storage network architecture facilitating transformation of one or more logical data objects (and/or data comprised thereof) on a physical and/or logical route between a computer sending a data access request to the logical data object and a storage location of the appropriate data, including embodiments wherein the transformation system is integrated, fully or partly, with the communication device, client and/or storage device.

Figure 2:
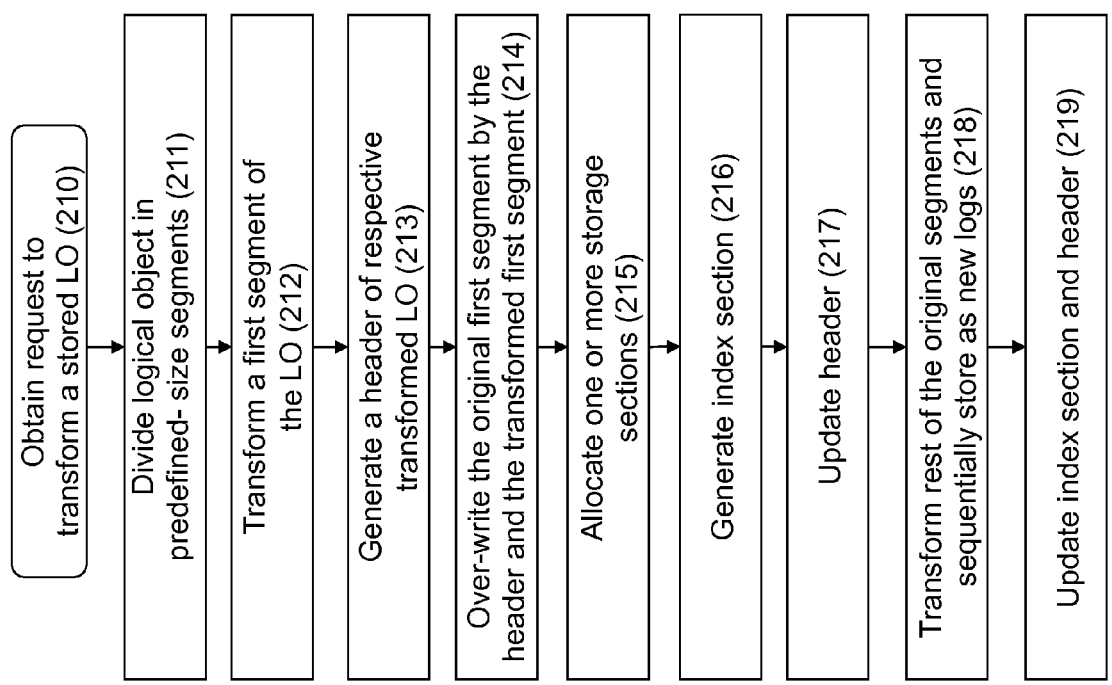
FIG. 2 illustrates a generalized flowchart of converting a stored non-transformed logical data object (LO) into transformed LO in accordance with certain embodiments of the present invention.

Referring to FIG. 2, there is illustrated a generalized flowchart of converting a stored non-transformed logical data object into transformed LO in accordance with certain embodiments of the present invention.

For purposes of illustration only, the following description is made with respect to processing logical data objects stored at the storage device by the transformation system 16, writing the processed data to the storage device 14, reading the data to be de-transformed (e.g. decrypted, decompressed, etc.) from the storage device, and de-transforming them by the transformation system 16. It should be noted, however, that the present invention is applicable in a similar manner to any purpose device operatively located on a physical and/or logical route between a computer sending an access-related request (e.g. open, read, write, etc.) to the LO and a storage device being a storage location of respective LOs (including the end points of said route, i.e. said computer and said storage device) and adapted to implement the teachings of the present invention.

Also it should be noted that the invention is, likewise, applicable to writing the processed data in a memory of any device on said route and later forwarding the entire transformed LO or parts thereof for storing at a storage location, as well as for forwarding the transformed data to be read from the storage location to any device on said route and further de-transformation.

Responsive to obtaining request (210) to transform a stored LO, the transformation system obtains the respective LO and logically divides (211) this non-transformed logical object in one or more segments with predefined size.

The request may be obtained in different ways. By way of non-limiting example, the transformation system may intercept an access (e.g. write) request to a certain LO, analyze if said certain LO matches a predefined criteria (e.g. said certain LO has no header comprising an indication of previously provided transformation), and if "Yes", may generate an internal request for transforming the respective LO. Additionally or alternatively, there may be a special maintenance unit fully or partly integrated with the transformation system, and/or with the storage device and/or with other external device, said unit configured to analyze stored LOs, recognize non-transformed LOs, and, in accordance with predefined criteria, to generate requests for transforming the non-transformed LOs. By way of non-limiting example, the predefined criteria may be related to characteristics of the logical data object (e.g. transformed/non-transformed LO, a size of the LO, pre-defined type and/or format of data, etc.) and/or a predefined/configurable time schedule (e.g. during non-working hours) and/or predefined/configurable events (e.g. administrator's request, absence of data access-related request to given LO during predefined/configurable period of time, available network bandwidths fitting predefined/configurable criteria, achieving predefined number of LOs recognized to be transformed, etc.).

The size of the segments may be predefined in accordance with an implemented storage protocol. For example, in certain embodiments of the invention, the size of the segments may be defined as maximal size of data in a single (or, optionally, multiple) I/O operation defined by a certain protocol. By way of a non-limiting example, the size of the segments for NFS protocol may be predefined as 32K bytes, for CIFS as 60K bytes, for Fiber Channel as 64K, etc. Optionally, the size of the first segment may differ from the size of other segments as will be further detailed with reference to FIG. 3. In certain embodiments of the invention the predefined size of segments may vary for different LOs, for example, depending on the type of LO (e.g. DB file, image file, etc.).

The transformation system further transforms (212) the first segment of the divided non-transformed LO into a transformed first segment and generates (213) a header for the transformed LO. The header comprises an indication (e.g. one or more flags) indicating a status of the transformation process and further details with reference to FIG. 3. The flag (or other indication) in the initially generated header points to an "in progress" status of converting the stored non-transformed LO into transformed LO.

If a size of the transformed first segment is greater than a predefined maximum size, the transformation system stops the transforming process for the LO. In certain embodiments of the invention, the transformation system may measure or estimate the size of the transformed first segment and, accordingly, may stop the transformation of the stored LO before actual data transforming and/or generating the header.

If the size of the transformed first segment is equal or less than the maximum predefined size, the transformation system overwrites (214) the first original segment of the stored LO with the generated header and the transformed first segment.

These operations constitute the first stage of the converting/replacing process.

The maximum size of the transformed first segment is predefined so that the original first segment may be in-place replaced by the transformed segment together with the header of the transformed LO (and, optionally, other headers and information sections, if applicable). Accordingly, said maximum size may be defined as a difference between the predefined size of the first segment and a predefined size (e.g. 512 B) of the header of a transformed LO (and, optionally, shall be further reduced by a size of header(s) of storage section (s) as will be further detailed with reference to FIG. 3). In addition, in certain embodiments of the invention the predefined size of the first segment and the maximum size of the first transformed segment are configured to enable providing the in-place replacement of the original first segment via a single write operation.

Upon successful fulfillment of the first stage, the transformation system provides initial indexing of the segments, generates (216) at least one index section comprising information with regard to all segments, and writes the index section(s) at the end of the LO.

As will be further detailed with reference to FIG. 3, after the initial indexing, the information with regard to a certain segment comprises, at least, an offset and size of the segment in the non-transformed LO, indication of a storage location of the segment, and indication if the segment comprises data in original or transformed form. Accordingly, the generated index section will initially comprise information indicating that the segments (except the first segment) comprise data in original form and are located at an original physical location, and the first segment comprises data in transformed form and located within the original location with offset equal to the predefined size of the header of the transformed LO.

Optionally (e.g. in order to preserve a uniform approach to the non-transformed data in the segments and further transformed original and/or updated data), the segments may be initially indexed, as will be further detailed with reference to FIG. 3, as data chunks are sequentially stored in one or more storage blocks (referred to hereinafter as storage sections or "SS") with a predefined size, wherein the storage sequence corresponds to the sequence of the segments in the non-transformed LO. Accordingly, when initially indexing the segments, the transformation system allocates (215) one or more storage sections at the physical location of the segments (transitional SS), and defines the segments as pertaining to the allocated storage section(s).

In certain embodiments of the invention with a fixed size of the logical objects (e.g. in a case of block-access protocol), the compression ratio sometimes may be not enough to provide, at the end of a LO, a free space sufficient for writing the index section. Accordingly, the transformation system may be configured to detect the upcoming overflow event (e.g. by determining the free space in LU, etc.) and to facilitate enlarging the storage logical unit by a predefined or calculated space accordingly. The transformation system may be further configured to detect a failure of said LU enlarging (e.g. because of unavailable additional disk space, inability of the storage device to support the dynamic LU changes, etc.), stop the transformation process and, if necessary, to recover the LO or parts thereof in a non-transformed form.

These operations of indexing and optional allocating the transitional storage section(s) constitute a second stage of the converting/replacing process.

Upon successful fulfillment of the second stage, the transformation system, as a third stage of the converting/replacing process, updates (217) the generated header, so that the flag (or other indication) in the updated header points to "complete" status of converting the stored non-transformed LO into transformed LO. The header may yet comprise an indication that the transformed logical object comprises data in transformed and non-transformed form.

Resulting from the above three stages, the non-transformed LO is replaced by the transformed LO. Unless the non-transformed LO comprises only one segment, the transformed LO at this phase (referred to hereinafter as the transitional phase) comprises data in both transformed and original form. All I/O(s) to the LO during the above converting/replacement process will be saved in a pending list and will be resumed at the end of the third phase of the process. After the third phase is completed, the LO will be accessible by access-related requests from any suitable User/Application.

The converting/replacing of small logical objects with a size smaller than or equal to the predefined size of the first segment may be provided in one stage. Replacement of the first segment (non-transformed LO) by the transformed segment together with the header of the transformed LO is provided with no indexing, wherein the header is configured to indicate the transformation completion.

Figure 3:
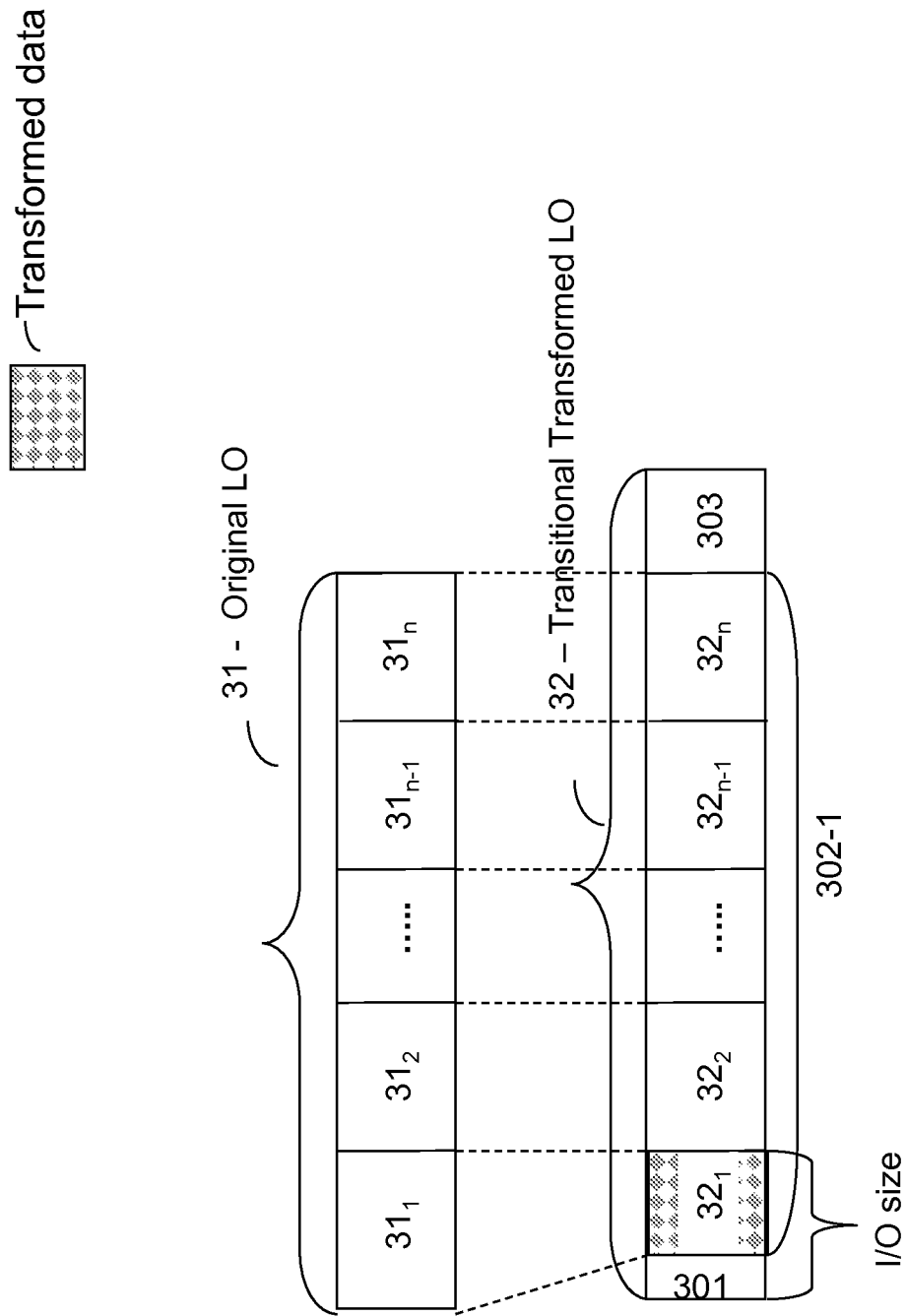
FIG. 3 illustrates a schematic diagram of the transformed logical data object in accordance with certain embodiments of the present invention.

The structure of the transformed LO is further detailed with reference to FIG. 3 illustrating a schematic diagram of the transformed logical data object in accordance with certain embodiments of the present invention.

The non-transformed LO 31 is logically divided into n segments $31_1$-$31_n$. By way of non-limiting example, the size of segments $31_1$-$31_{n-1}$ is equal to the maximum size of the data in a single I/O operation in accordance with respective storage protocol (referred to hereinafter as "I/O size"). The size of the last segment may be equal to or less than the I/O size. In certain embodiments of the invention the size of the first segment may be equal to the sum of the I/O size and the predefined size of a header of the transformed LO. Such size facilitates preserving a uniform approach to read operations on transformed LOs (having the header) and non-transformed LOs.

The transformed LO 32 at the transitional phase comprises the header 301, segment $32_1$ comprising transformed data, segments $32_2$-$32_n$ comprising original data, and the index sections 303. The total size of the header and the segment $32_1$ is equal to or less than the I/O size. Thus over-writing the original first segment by the header and the transformed first segment may be provided by a single write operation, thereby enabling data integrity as will be detailed below.

If the total size of the header and the segment $32_1$ is less than the I/O size, the transformation system may handle the bytes between the end of the segment $32_1$ and the start of the next segment $32_2$ as meaningless.

The header 301 of the transformed LO comprises a unique LO descriptor; a flag indicating the transformation status, the flag being updated upon completion of the respective stages (e.g. in progress, completed, recovery); information about the size of the non-transformed LO 31; and, optionally, a signature indicating that the LO has been processed by the transformation system 16. The header may further include a pointer to the physical location of the index section(s) 303, and, optionally, an indication if at least a part or portion of the segments comprises data in original form.

Optionally, in certain embodiments of the present invention (e.g. in certain embodiments where transformation/de-transformation functionalities are integrated with the storage device, etc.) the header 301 or its parts and/or combinations thereof may constitute a part of the file system. For example, a file identifier used in a certain file system (e.g. node ID) may be used as the unique file descriptor of the compressed file, a file record in the file system may be modified and may comprise additional fields, e.g. for information about the size of the raw file, said signature, etc. The index section or parts thereof may also constitute a part of the file system.

The segments $32_1$-$32_n$ are indexed as data chunks sequentially stored into one or more storage blocks with a predefined size, wherein the storage sequence corresponds to the sequence of the segments in the non-transformed LO. Said storage blocks serve as atomic elements of transformation/de-transformation operations during input/output transactions on the LO. In the following description the term "storage section (SS) should be expansively construed to cover any storage block with a predefined size configured to store data chunks within transformed LO and serving as atomic elements for transforming/de-transforming operations in accordance with certain embodiments of the present invention. The storage sections may have equal predefined sizes, or, alternatively, the transformation system may calculate the predefined size for certain storage section(s) in accordance with a predefined criterion. Such a predefined criterion may be an event of generating transformed LO for replacing the non-transformed LO, and the size of the storage section(s) for this event (referred hereinafter as "transitional storage section") may be defined as a size of a certain number of segments, or the total size of all n segments comprised in the non-transformed LO, or otherwise. In the non-limiting example illustrated in FIG. 3, the size of the transitional storage section 302 is equal to "n*I/O size less the size of the header 301". By way of another non-limiting example, the size of the transitional storage section 302 may be equal to "n*I/O size". If necessary, the transformation system may further provide data padding for the first transformed segment and/or last segment to fit the total size of n storage segments to the size of the storage section.

For purpose of illustration only, the following description is made with respect to data chunks stored in the transformed LO in a log form (referred to hereinafter as logs). It should be noted that the invention is not bound by the log form and is, likewise, applicable to journal or any other form of sequential storage of the chunks of data.

In certain embodiments of the present invention each storage section has an assigned flag (e.g. a bit flag 1 or 0) indicating its use/re-use condition (not shown) and stored in the index section. Accordingly, each log within the storage section has the same flag as the section. When stored at a new physical location, the storage section is provided with flag 0. Transitional storage section (and respective logs) is also provided with flag 0. When stored at a physical location previously occupied by another storage section, the storage section is provided with a flag opposite of the flag of said another storage section being rewritten. Accordingly, new logs being written to a certain physical location can be differentiated from old logs previously stored at said physical location into the old (being rewritten) storage section as having different flags. This process is further detailed in International Applications WO2007138600, WO2007138601 and WO2007138602 published Dec. 12, 2007, assigned to the assignee of the present application and incorporated hereby by reference in their entirety.

Typically, a storage section comprises a header of the storage section. This header comprises a unique identifier of the storage section. The header may further comprise an indication of physical storage location pertaining to the storage section and a flag assigned to the storage section and indicating use/re-use condition; alternatively or additionally, this information may be stored in the index section. Optionally the header of the storage section (and/or the header 301 and/or index section) may also comprise information related to external data involved in the transformation (e.g. information related to the secure key used for encryption of the data chunks comprised in the storage section as, for example, key ID, pointer to key physical location, metadata related to the key, etc.). In certain embodiments of the invention (e.g. as illustrated in FIG. 3) the transitional SS does not comprise the header and all necessary information is stored in the index section. Unique identifier of the transitional SS may be replaced by an indication in the index section pointing that the logs in the transitional SS (excluding first segment which may have special indexing) comprise the same data located at the same location as in the non-transformed LO. In the embodiments when the transitional SS comprises the header, the total size of the LO header, SS header and the transformed first segment $32_1$ may be equal to or less than the original size of the first segment $31_1$.

The index section 303 comprises at least one entry associated with at least one storage section, this entry comprises pointer(s) (or other indicators) to the physical storage location of the storage section and records related to the respective logs stored in the SS (e.g. offset and size of the logs in the non-transformed LO, association with the storage section, one or more flags assigned to the logs, a signature indicating if at least part of the logs comprise data in original and/or partly transformed form), said records referred to hereinafter as "log records".

As will be further detailed with reference to FIG. 4, the information in the index section facilitates a one-to-one relationship between each point in the non-transformed data range and the data to be read from the logs.

FIGS. 2 and 3 describe a process of converting/replacing a stored non-transformed LO into a transformed LO that enables data integrity of the logical data objects at all stages of the converting/replacing process.

For example, if recovery is necessary after the first stage (i.e. when the first segment is overwritten with the header and the transformed first segment), the recovery may be provided as following: a) read the header; b) if the header comprises an indication that the transformation is "in progress", then recover the first segment, rest of the data in the LO are original and do not require recovery; c) if the LO is opened with Read/Write permissions, then proceed with the converting process. If the LO is opened with Read Only permission, the transformation process will be stopped and the recovered LO will be a non-transformed LO.

If recovery is necessary at any time while generating and writing the index (second stage), the recovery process is the same as for the first stage, wherein the existing index is ignored and generated from the beginning The offset of the index section may be recognized in accordance with the original size of the LO contained in the header.

Referring back to FIG. 2, the transformation (218) of the rest of original data comprised in the transformed LO may start just after completion of the third stage described above or, fully or partly, be provided later in accordance with pre-defined criteria. The transformation system further updates (219) the index section and the header as will be further detailed with reference to FIGS. 4a-4c.

The postponed process of further transformation may be triggered in different ways. By way of a non-limiting example, the transformation system may intercept a write request to the transformed LO, analyze if said LO comprises data in original form (e.g. in accordance with information comprised in the header of the LO), and if "Yes", may generate an internal request for transforming the non-transformed stored data in the respective LO. This internal request may have a priority lower than any access request to the respective LO. Additionally or alternatively, the special maintenance unit integrated with the transformation system or with the storage device may scan the transformed LOs stored at the storage device, recognize LOs comprising data in original form, and, in accordance with predefined criteria, generate requests for transforming the original data. By way of another non-limiting example, the criteria may be related to characteristics of the logical data object (e.g. a size of LO, pre-defined type and/or format of data and/or LO) and/or a predefined/configurable time schedule (e.g. during non-working hours) and/or predefined/configurable events (e.g. administrator's request, start of storage optimization process, absence of data access-related request to given LO during predefined/configurable period of time, available network bandwidths fitting predefined/configurable criteria, achieving predefined number of recognized LOs, etc.).

Figure 4C:
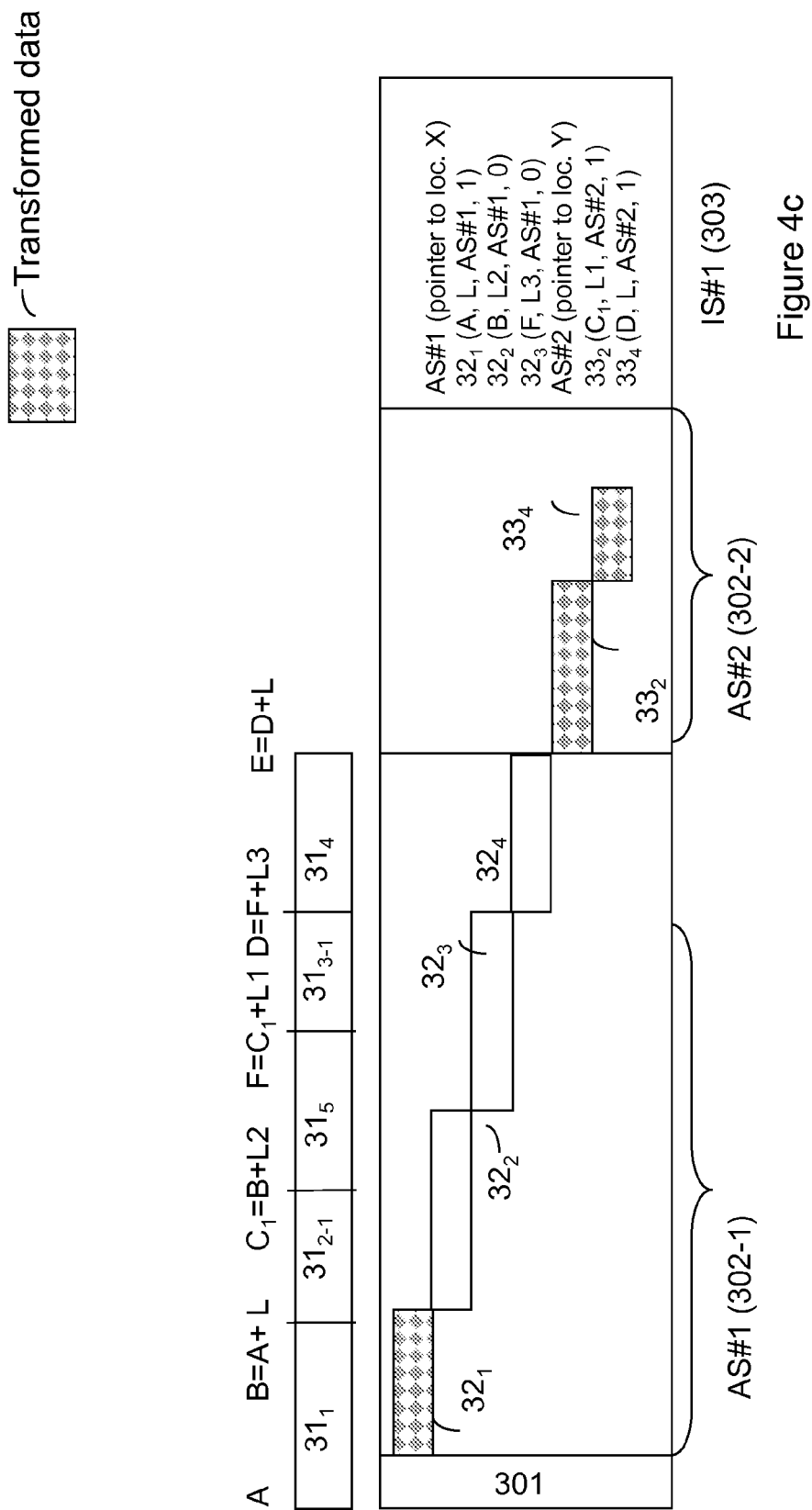

Referring to FIGS. 4a-c, there are illustrated schematic diagrams of transformed logical data objects during a process of further transforming and concurrent updating process.

In the example illustrated in FIG. 4a, segments $31_1$-$31_4$ constituting the original LO have been indexed as sequential logs $32_1$-$32_4$ stored in the transitional storage section 302-1, wherein the log $32_1$ comprises data in transformed form and logs $32_2$-$32_4$ comprise data in original form. The index section 303 comprises information related to said storage section and the logs thereof. By way of non-limiting example, the illustrated index section comprises a storage section ID with a pointer to physical location (QWORD) and a list of respective records comprising offset (QWORD) and length (WORD) of original data corresponding to the logs stored in the section. Each illustrated record also includes indication if the respective log comprises data in an original form (0) or transformed form (1).

In certain embodiments of the invention the index section may comprise one, mostly updated, log record with respect to each log. In other embodiments, the entry may comprise updated and outdated records with respect to the same log.

There are several ways of updating the index section 303. The corresponding entries may be written /updated simultaneously with every update to the stored logical object, or at a certain later time (e.g. when starting a new storage section) based on data comprised in the storage section(s), but not later than closing the logical data object.

The exemplified information in the index section means that range AB in the non-transformed LO (offset A, length L) corresponds to the transformed data in log $32_1$; range BC (offset B, length L) corresponds to the original data in log $32_2$; range CD (offset C, length L) correspond to the original data in log $32_3$; and range DE (offset D, length L) corresponds to original data in the log $32_4$.

The exemplified schematic diagram in FIG. 4*b* illustrates the above transformed LO resulting in a write request intercepted by the transformation system. The exemplified request is for writing a new data chunk $31_5$ having length L1, said data chunk may replace the data in the non-transformed LO starting from offset $C_1$, where $(C_1+L1)=F<D$. The new chunk of data is transformed by the transformation system and may be stored in the respective storage section. The transformation, as well as further I/O operations may be provided in a manner similar to detailed in International Applications WO2007138600, WO2007138601 and WO2007138602 published Dec. 12, 2007, assigned to the assignee of the present application and incorporated hereby by reference in their entirety.

The storage section may be a currently active SS having a free space or it may be a new SS allocated by the transformation system when necessary (e.g. if there is no currently active allocated SS or if there is no sufficient free space therein). In the illustrated example, there is no sufficient free space in the storage section 302-1. Accordingly, the new storage section 302-2 is opened, and the new log $33_2$ comprising the transformed data corresponding to the received new data chunk is stored in the storage section. The previously stored logs are kept unchanged, while the index section 303 is updated in a manner facilitating a one-to-one relationship between each point in the non-transformed data range and the "live" data to be read from the logs.

In the example illustrated in FIG. 4*b* the index section comprises the last updated records. The updated information in the index section means that the updated range AE corresponds to the following data in the logs:
the range AB corresponds to data to be de-transformed from the log $32_1$ in the storage section #1 with physical location X,
the range $BC_1$ corresponds to the part of original data (namely offset B, length L2) to be read from the log $32_2$ in the storage section #1 with physical location X,
the updated range $C_1F$ corresponds to data to be de-transformed from the new log $33_2$ in the storage section #2 with physical location Y,
the range FD corresponds to the part of original data in log $32_3$ (namely offset F, length L3) in the storage section #1 with physical location X,
the range DE corresponds to the original data in the log $32_4$ in the storage section #1 with physical location X.

In the illustrated example, all data comprised in the logs $32_1$, $33_2$ and $32_4$ are live, while part of the data comprised in the logs $32_2$ (namely range $C_1C$) and $32_3$ (namely range CF) are outdated.

The exemplified schematic diagram in FIG. 4*c* illustrates the transformed LO that resulted from further transformation of a part of the non-transformed data stored in the transitional SS. Upon receiving the request for further transformation (as detailed with reference to transformation operation (218)), the transformation system checks the records in the index section in order to recognize among segments $32_2$-$32_4$ one or more logs comprising live (i.e. yet non-updated) ranges in non-transformed form. When such a range is found, the transformation system processes the respective range and sequentially stores the transformed data as a new log in the active storage section. In certain embodiments of the invention the transformation system may be configured to provide such processing in accordance with predefined criteria—e.g. only if the entire range of data in a given segment is live data, or live data constitutes no less than a certain part of the entire data in the segment, etc. The transformation system may be further configured to process the segments comprising merely live data before processing the live data from the segments comprising a combination of live data and outdated data.

When the processing of a given range is completed, the compression system prepares log-related information to be recorded in the index section. The transformation system further checks to determine if there is a next range with live non-transformed data, and then repeats the transformation process. In certain embodiments of the invention, the transformation system may interrupt the repeating of the transformation operation for a next range when obtaining an access request to the respective LO. The transformation of a next range may be also postponed in accordance with certain criteria (e.g. a predefined/configurable time schedule and/or predefined/configurable events).

If the free space in the active storage section is insufficient to store the next transformed log (e.g. writing operation fails on target buffer overflow, estimated expected log size more than said free space, free space is less than size of data chunk to be processed or predefined part thereof, etc.), but still not all the desired data in the transitional storage section is transformed, the transformation system allocates a new storage section.

The transformed logs are moved to the storage location in a "sync-flush" mode enabling all pending output to be flushed to the output (storage) buffer without a reset of transformation operation. Further provided updating the index section facilitates mapping between the data in the non-transformed logical data object and the data stored in the storage sections.

In the exemplified embodiment illustrated in FIG. 4*c*, the transformation system is configured to start further transformation from logs with the entire range of data being live data in non-transformed form (log $32_4$ in the illustrated example). The transformation system transforms the data in the log and stores the transformed log $33_4$ in storage section 302-2. The logs $33_4$ and $33_2$ are sequentially stored in accordance with the order they have been processed. In certain embodiments of the invention the transformation system may provide processing related to I/O operations with priority higher than further transforming the non-transformed data.

The updated information in the index section means that the updated range AE corresponds to the following data in the logs:
the range AB corresponds to data to be de-transformed from the log $32_1$ in the storage section #1 with physical location X, the range $BC_1$ corresponds to the part of original data (namely offset B, length L2) to be read from the log $32_2$ in the storage section #1 with physical location X, the updated range $C_1F$ corresponds to data to be de-transformed from the log $33_2$ in the storage section #2 with physical location Y, the range FD corresponds to the part of original data in log $32_3$ (namely offset F, length L3) in the storage section #1 with physical location X, the range DE corresponds to data to be de-transformed from the new log $33_4$ in the storage section #2 with physical location Y.

In the illustrated example, all data comprised in the logs $32_1$, $33_2$ and $33_4$ are live, while part of the data comprised in the logs $32_2$ (namely range $C_1C$) and $32_3$ (namely range CF) and data in the log $32_4$ are outdated.

As illustrated by non-limiting example in FIGS. 4a-4c, the teachings of the present invention enable handling stored transformed logical data objects comprising data in both transformed and original forms, as well as enable the users to provide I/O operations concurrently with the transformation process.

Figure 5:
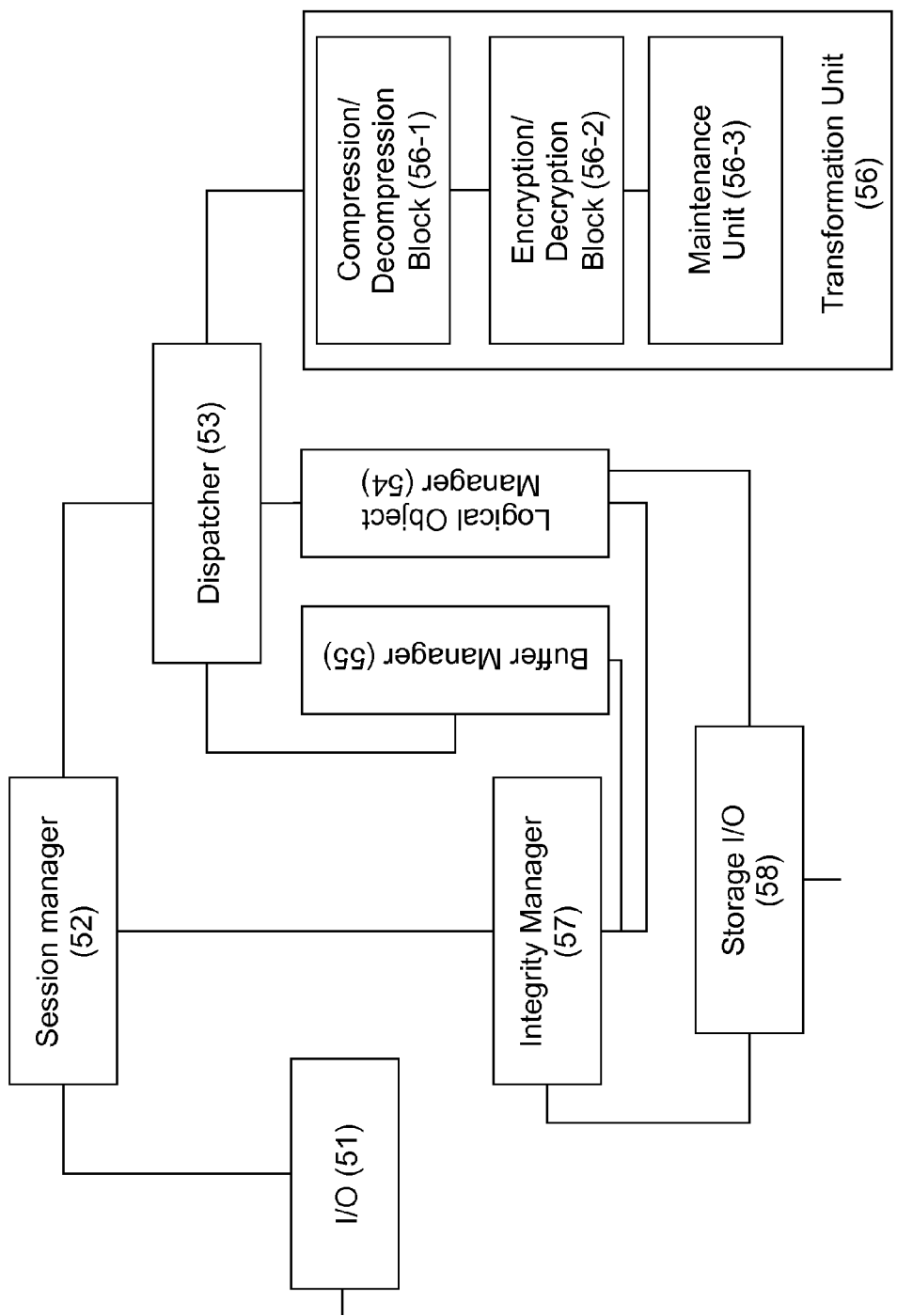
FIG. 5 illustrates a schematic functional block diagram of the transformation system in accordance with certain embodiments of the present invention.

FIG. 5 illustrates a schematic functional block diagram of the transformation system 16 in accordance with certain embodiments of the present invention. The transformation system comprises a Client Input/Output (I/O) block 51 coupled to a session manager 52. The client I/O block gets data access-related requests (e.g. read, write, set end of LO/truncate, etc.) from external clients/applications or from the internal maintenance unit 56-3 and forwards them to the session manager.

A session starts by an access request to a logical data object (e.g. LUN capacity request as, for example, SCSI LUN capacity request command; open file request, etc.) and ends by disconnect request (e.g. "LUN disconnect", "close file", etc.) received from the same IP address (user) with regard to the same logical object. The session may handle one or more access requests addressed to the same logical data object (e.g. from multiple applications running on the same client, multiple requests from certain single applications, requests from multiple clients, etc.).

The session manager 52 holds all the session's private data as, for example, source session address, session counters, session status, all instances for the buffers in use, etc. The session manager also handles blocking all the relevant resources when the logical data object is open and releasing said resources on disconnect. The session manager is further configured to manage one or more sessions with access requests addressed to the same logical data object.

The session manager transfers all requests to a dispatcher 53 operatively coupled to the session manager. The dispatcher 53 is operatively coupled to a logical data object manager 54, a buffer manager 55 and a transformation unit 56. The dispatcher 133 communicates with the logical data object manager 54 for data related transactions (e.g. Read, Write, set end of LO, etc.) and the transformation unit 56 for transforming operations in accordance with certain embodiments of the present invention.

The transformation unit 56 is capable of compressing, encrypting and/or otherwise transforming data, and sending it to a physical disk through a storage I/O 58; as well as of reading data from the physical disk through the storage I/O, de-transforming (e.g. decrypting and/or decompressing) the respective buffer and, optionally, of segmenting and/or combining original and/or partly transformed data chunks for further processing. The transformation unit may comprise one or more transformation blocks responsible for certain transforming operations (e.g. compression-decompression block 56-1 operatively coupled with the encryption/decryption block 56-2, maintenance unit 56-3 configured to initiate replacing non-transformed LOs by transformed LOs as detailed with reference to FIGS. 2-4), and is configured to facilitate data transfer and necessary synchronization between said blocks. The transformation unit is also configured to report size of non-transformed logical data object (and free storage capacity) in reply to "Capacity status".

The transformation unit 56 is further configured to communicate with one or more external platforms storing external information related to data involved in the transformation process (e.g. the secure keys for receiving the keys and/or metadata thereof); to receive the information, extract or generate the necessary data (e.g. key ID) and to manage thereof. The received information may be temporarily stored in a trusted memory within the transformation system, wherein the transformation unit block may provide a management of the information (e.g. to manage storage of certain keys in said memory for a certain time period in accordance with a certain policy). In certain embodiments of the invention the encryption/decryption block 56-2 may further generate one or more encryption initialization vectors to be used for encryption (e.g. together with secure keys).

The logical object manager 54 is responsible for the ordering and memory sharing by different logical data objects and parts thereof.

The buffer manager 55 manages the memory buffer resources and is responsible for allocating and releasing memory buffer for operations of other blocks. The transformation system further comprises an integrity manager 57 coupled to the session manager, the buffer manager and the data block manager. The integrity manager is responsible for synchronization and general control of all processes in the transformation system as, for example keeping the integrity of the logical data objects, etc. The integrity manager 57 is also responsible for flashing the memory buffer to the physical disk(s) through the storage physical I/O interface 58, and reading when needed from the disk(s).

Those skilled in the art will readily appreciate that the invention is not bound by the configuration of FIG. 5; equivalent and/or modified functionality may be consolidated or divided in another manner and may be implemented in software, firmware, hardware, or any combination thereof.

Referring to FIG. 6, there is illustrated a generalized flowchart of a read operation on a transformed logical data object (LO) in accordance with certain embodiments of the present invention.

The read operation starts with a read request 600 identifying the offset of data in the LO and the range of data to be read. The transformation system 16 addresses all index sections (e.g. sequentially starting from the last section or from the currently open; or opening all together, etc.) to find out 601 all last updated entries related to the data within the range. As was detailed with reference to FIG. 4, the last-updated entries in the index section facilitate a one-to-one relationship between the data in the range and the live (mostly updated) data to be extracted from the logs. Accordingly, the transformation system sequentially de-transforms 602 (e.g. decrypts, decompresses, decode, etc.) one of the storage sections corresponding to found entries, and finds the required data 603. In certain embodiments of the invention if the last updated entries for a certain range correspond to the logs in the transitional storage section(s) and, accordingly, comprise (excluding the log corresponding to the first segment) non-transformed data located at the original location, the transformation system may read the respective logs without reading the entire transitional SS. The operations 602-603 are repeated 604 to the next storage section(s) until all data from the range have been found. The found data are arranged 605 in accordance with their order in the range. After the data is ready, the data may be sent 606 to an application.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present invention.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method for storing data, comprising:
   storing a logical data object (LO) in a storage device;
   logically dividing the LO into a non-transformed first segment including a segment size and one or more non-transformed subsequent segments in response to a respective transformation request;
   estimating a transformed size for the non-transformed first segment prior to performing a transformation process;
   comparing the estimated transformed size and the segment size;
   if the estimated transformed size is greater than the segment size, stopping the transformation process prior to transforming the non-transformed first segment and maintaining the first segment in the non-transformed LO;
   if the estimated transformed size is less than or equal to the segment size, transforming the non-transformed first segment to generate a transformed first segment comprising data in transformed form, generating a header for the transformed first segment, and overwriting said first segment with said header and said transformed first segment;
   if said first segment is overwritten:
      generating an index comprising information about the transformed first segment and the one or more non-transformed subsequent segments, and
      writing the index to the LO; and
   in response to a request to read a range of data:
      determining each created or last-updated entry in the index related to the data within the range, and
      extracting the data in accordance with:
         for the data in the first segment, de-transforming the first segment and extracting the data in the first segment,
         for the data in the one or more subsequent non-transformed segments, reading the respective segments and extracting the data in the one or more subsequent non-transformed segments,
         for other data, de-transforming each respective segment and extracting the other data, and
         arranging each extracted data in accordance with an extracted order of the data.

2. The method of claim 1, further comprising:
   writing, in the index, that the first segment comprises the data in transformed form; and
   writing, in the index, that the one or more non-transformed subsequent segments comprise data in original form.

3. The method of claim 1, further comprising:
   writing, in the index, that the non-transformed first segment is located at a first original location in the LO; and
   writing, in the index, that the one or more non-transformed subsequent segments are located in a second original location in the LO.

4. The method of claim 3, wherein writing the index to the LO comprises writing the index at an end of the LO, the method further comprising:
   generating a header for the LO, the header indicating that the LO comprises the transformed first segment and the one or more non-transformed subsequent segments;
   replacing the non-transformed first segment with the transformed first segment and the header in the first original location if the transformed first segment and the header include a size that is less than or equal to a size of the non-transformed first segment; and
   updating the index if the non-transformed first segment is replaced in the first original location with the transformed first segment and the header.

5. The method of claim 1, further comprising:
   determining whether the LO includes sufficient space at an end of the LO to store the index;
   storing the index at he end of the LO if the LO includes the sufficient space; and
   declining to store the index at the end of the LO if the LO includes insufficient space.

6. The method of claim 1, further comprising:
   determining whether the LO includes sufficient space at an end of the LO to store the index;
   enlarging the LO in response to a determination that the LO includes sufficient space at an end of the LO to store the index; and
   storing the index at the end of the LO subsequent to enlarging the LO if the enlarged LO includes sufficient space to store the index at the end of the LO.

7. The method of claim 6, further comprising:
   determining whether the enlarged LO includes sufficient space at the end of the LO to store the index; and
   stopping transformation of the non-transformed first segment if the enlarged LO includes sufficient space to store the index at the end of the LO.

8. The method of claim 7, further comprising recovering any transformed portions of the non-transformed first segment if the enlarged LO includes sufficient space to store the index at the end of the LO.

9. A system for storing data, comprising:
   a storage device; and
   a processor coupled to the storage device, the processor configured to:
      store a logical data object (LO) in the storage device,
      logically divide the LO into a non-transformed first segment including a segment size and one or more non-transformed subsequent segments in response to a respective transformation request,
      estimate a transformed size for the non-transformed first segment prior to performing a transformation process;

compare the estimated transformed size and the segment size,
if the estimated transformed size is greater than the segment size, stop the transformation process prior to transforming the non-transformed first segment and maintain the first segment in the non-transformed LO,
if the total size is less than or equal to the segment size, transform the non-transformed first segment to generate a transformed first segment comprising data in transformed form, generate a header for the transformed first segment, and overwrite said first segment with said header and said transformed first segment,
if said first segment is overwritten:
generate an index comprising information about the transformed first segment and the one or more non-transformed subsequent segments, and
write the index to the LO, and in response to a request to read a range of data:
determine each created or last-updated entry in the index related to the data within the range, and
extract the data in accordance with:
for the data in the first segment, de-transforming the first segment and extracting the data in the first segment,
for the data in the one or more subsequent non-transformed segments reading the respective segments and extracting the data in the one or more subsequent non-transformed segments,
for other data, de-transforming each respective segment and extracting the other data, and
arranging each extracted data in accordance with an extracted order of the data.

10. The system of claim 9, wherein the processor is further configured to:
write, in the index, that the first segment comprises the data in transformed form; and
write, in the index, that the one or more non-transformed subsequent segments comprise data in original form.

11. The system of claim 9, wherein the processor is further configured to:
write, in the index, that the non-transformed first segment is located at a first original location in the LO; and
write, in the index, that the one or more non-transformed subsequent segments are located in a second original location in the LO.

12. The system of claim 11, wherein, when writing the index to the LO, the processor is configured to write the index at an end of the LO, wherein the processor is further configured to:
generate a header for the LO, the header indicating that the LO comprises the transformed first segment and the one or more non-transformed subsequent segments;
replace the non-transformed first segment with the transformed first segment and the header in the first original location if the transformed first segment and the header include a size that is less than or equal to a size of the non-transformed first segment; and
update the index if the non-transformed first segment is replaced in the first original location with the transformed first segment and the header.

13. The system of claim 9, wherein the processor is further configured to:
determine whether the LO includes sufficient space at an end of the LO to store the index;
store the index at the end of the LO if the LO includes the sufficient space; and
decline to store the index at the end of the LO if the LO includes insufficient space.

14. The system of claim 9, wherein the processor is further configured to:
determine whether the LO includes sufficient space at an end of the LO to store the index;
enlarge the LO in response to a determination that the LO includes sufficient space at an end of the LO to store the index; and
store the index at the end of the LO subsequent to enlarging the LO if the enlarged LO includes sufficient space to store the index at the end of the LO.

15. The system of claim 14, wherein the processor is further configured to:
determine whether the enlarged LO includes sufficient space at the end of the LO to store the index; and
stop transformation of the non-transformed first segment if the enlarged LO includes sufficient space to store the index at the end of the LO.

16. The system of claim 15, wherein the processor is further configured to recover any transformed portions of the non-transformed first segment if the enlarged LO includes sufficient space to store the index at the end of the LO.

17. A computer program product comprising a non-transitory computer useable medium including a computer readable program code embodied therein for storing data, the computer program product comprising:
computer code for storing a logical data object (LO) in a storage device;
computer code for logically dividing the LO into a non-transformed first segment including a segment size and one or more non-transformed subsequent segments in response to a respective transformation request;
computer code for estimating a transformed size for the non-transformed first segment prior to performing a transformation process;
computer code for comparing the estimated transformed size and the segment size;
computer code for stopping the transformation process prior to transforming the non-transformed first segment and maintaining the first segment in the non-transformed LO if the total size is greater than the segment size;
computer code for transforming the non-transformed first segment to generate a transformed first segment comprising data in transformed form, generating a header for the transformed first segment, and overwriting said first segment with said header and said transformed first segment if the estimated transformed size is less than or equal to the segment size;
if said first segment is overwritten:
computer code for generating an index comprising information about the transformed first segment and the one or more non-transformed subsequent segments, and
computer code for writing the index to the LO; and
in response to a request to read a range of data:
computer code for determining each created or last-updated entry in the index related to the data within the range, and
computer code for extracting the data in accordance with:
for the data in the first segment, computer code for de-transforming the first segment and extracting the data in the first segment,
for the data in the one or more subsequent non-transformed segments, computer code for reading the respective segments and extracting the data in the one or more subsequent non-transformed segments,
for other data, computer code for de-transforming each respective segment and extracting the other data, and
computer code for arranging each extracted data in accordance with an extracted order of the data.

18. The computer program product of claim 17, further comprising:
computer code for writing, in the index, that the first segment comprises the data in transformed form; and
computer code for writing, in the index, that the one or more non-transformed subsequent segments comprise data in original form.

19. The computer program product of claim 17, further comprising:
computer code for writing, in the index, that the non-transformed first segment is located at a first original location in the LO; and
computer code for writing, in the index, that the one or more non-transformed subsequent segments are located in a second original location in the LO.

20. The computer program product of claim 19, wherein the computer code for writing the index to the LO comprises computer code for writing the index at an end of the LO, the method further comprising:
computer code for generating a header for the LO, the header indicating that the LO comprises the transformed first segment and the one or more non-transformed subsequent segments;
computer code for replacing the non-transformed first segment with the transformed first segment and the header in the first original location if the transformed first segment and the header include a size that is less than or equal to a size of the non-transformed first segment; and
computer code for updating the index if the non-transformed first segment is replaced in the first original location with the transformed first segment and the header.

21. The computer program product of claim 17, further comprising:
computer code for determining whether the LO includes sufficient space at an end of the LO to store the index;
computer code for storing the index at the end of the LO if the LO includes the sufficient space; and
computer code for declining to store the index at the end of the LO if the LO includes insufficient space.

22. The computer program product of claim 17, further comprising:
computer code for determining whether the LO includes sufficient space at an end of the LO to store the index;
computer code for enlarging the LO in response to a determination that the LO includes sufficient space at an end of the LO to store the index; and
computer code for storing the index at the end of the LO subsequent to enlarging the LO if the enlarged LO includes sufficient space to store the index at the end of the LO.

23. The computer program product of claim 22, further comprising:
computer code for determining whether the enlarged LO includes sufficient space at the end of the LO to store the index; and
computer code for stopping transformation of the non-transformed first segment if the enlarged LO includes sufficient space to store the index at the end of the LO.

24. The computer program product of claim 23, further c comprising computer code for recovering any transformed portions of the non-transformed first segment if the enlarged LO includes sufficient space to store the index at the end of the LO.

* * * * *